United States Patent
Liland et al.

(10) Patent No.: US 9,582,321 B2
(45) Date of Patent: Feb. 28, 2017

(54) SYSTEM AND METHOD OF DATA PROCESSING

(71) Applicant: SWARM64 AS

(72) Inventors: Eivind Liland, Berlin (DE); Thomas Richter, Berlin (DE)

(73) Assignee: SWARM64 AS (NO)

( * ) Notice: Subject to any disclaimer, the term of this patent is extended or adjusted under 35 U.S.C. 154(b) by 522 days.

(21) Appl. No.: 14/075,600

(22) Filed: Nov. 8, 2013

(65) Prior Publication Data

US 2015/0135182 A1 May 14, 2015

(51) Int. Cl.
| | |
|---|---|
| G06F 15/00 | (2006.01) |
| G06F 9/40 | (2006.01) |
| G06F 9/48 | (2006.01) |
| G06F 9/38 | (2006.01) |
| G06F 9/30 | (2006.01) |
| G06F 9/32 | (2006.01) |
| G06F 9/45 | (2006.01) |
| G06F 9/455 | (2006.01) |

(52) U.S. Cl.
CPC .......... *G06F 9/4881* (2013.01); *G06F 8/4452* (2013.01); *G06F 9/3009* (2013.01); *G06F 9/30043* (2013.01); *G06F 9/322* (2013.01); *G06F 9/3851* (2013.01); *G06F 9/3867* (2013.01); *G06F 9/3877* (2013.01); *G06F 9/3885* (2013.01); *G06F 9/3887* (2013.01); *G06F 9/45516* (2013.01); *G06F 2209/5017* (2013.01)

(58) Field of Classification Search
None
See application file for complete search history.

(56) References Cited

U.S. PATENT DOCUMENTS

| | | | |
|---|---|---|---|
| 6,170,051 B1 * | 1/2001 | Dowling | G06F 9/3001 712/200 |
| 6,289,434 B1 * | 9/2001 | Roy | G06F 15/8007 712/22 |
| 7,761,697 B1 | 7/2010 | Coon et al. | |
| 7,849,291 B2 * | 12/2010 | Hansen | G06F 9/30 712/220 |
| 8,381,203 B1 | 2/2013 | Beylin et al. | |
| 9,229,721 B2 * | 1/2016 | Chen | G06F 9/322 |

(Continued)

OTHER PUBLICATIONS

PCT/EP2014/072901—International Search Report and Written Opinion, Jan. 29, 2015.

*Primary Examiner* — Michael Sun
(74) *Attorney, Agent, or Firm* — Fellers, Snider, Blankenship, Bailey & Tippens, P.C.; Terry L. Watt

(57) ABSTRACT

A data processing apparatus, a data processing method and a computer program product are disclosed. In an embodiment, the data processing apparatus comprises: a processor comprising a plurality of parallel lanes for parallel processing of sets of threads, each lane comprising a plurality of pipelined stages, the pipelined stages of each lane being operable to process instructions from the sets of threads; and scheduling logic operable to schedule instructions for processing by the lanes, the scheduling logic being operable to identify that one of the sets of threads being processed is to be split into a plurality of sub-sets of threads and to schedule at least two of the plurality of sub-sets of threads for processing by different pipelined stages concurrently.

20 Claims, 9 Drawing Sheets

(56) References Cited

U.S. PATENT DOCUMENTS

| | | | | |
|---|---|---|---|---|
| 9,256,429 B2* | 2/2016 | Chen | ................... | G06F 9/30072 |
| 2004/0250045 A1* | 12/2004 | Dowling | ............... | G06F 9/3842 |
| | | | | 712/10 |
| 2006/0230408 A1* | 10/2006 | Frigo | .................. | G06F 9/30043 |
| | | | | 718/108 |
| 2006/0230409 A1* | 10/2006 | Frigo | .................... | G06F 9/4843 |
| | | | | 718/108 |
| 2011/0219221 A1 | 9/2011 | Skadron et al. | | |
| 2012/0204014 A1 | 8/2012 | Leather et al. | | |
| 2012/0216012 A1* | 8/2012 | Vorbach | ................. | G06F 8/443 |
| | | | | 712/11 |
| 2014/0215187 A1* | 7/2014 | Yazdani | ................. | G06F 8/445 |
| | | | | 712/206 |
| 2014/0351551 A1* | 11/2014 | Doerr | ................. | G06F 12/0215 |
| | | | | 711/204 |

\* cited by examiner

|   | Instruction Pointer | Threads | Parent Pointer | Depth Counter |
|---|---|---|---|---|
| 0 | X | 0000 | X | 1 |
| 1 | 37 | 1000 | 0 | 0 |
| 2 | X | 0010 | 0 | 2 |
| 3 | 274 | 0100 | 2 | 0 |
| 4 |   |   |   |   |
| 5 | 360 | 0001 | 2 | 0 |

SYSTEM AND METHOD OF DATA PROCESSING

FIELD OF THE INVENTION

The present invention relates to a data processing apparatus, a data processing method and a computer program product.

BACKGROUND

Traditional microprocessors issue and execute single instructions one after the other. The instructions typically perform a single operation on two scalar values, producing a result. Single-issue variants issue one instruction per clock cycle, which is then processed by one of the execution units. Execution units typically include at least an adder, a multiplier, a load/store unit, and a branch unit. Processors such as these run a single program thread at a time, and belong to the group of single threaded processors, although an operating system may create the illusion of multiple simultaneous threads by configuring the processor to switch between threads at a certain interval. Although these kinds of processors have low performance, they also have a small silicon area, and therefore a reasonable performance per silicon area. There are processor variants which issue and execute multiple instructions at the same time. These multiple-issue variants kinds of processors have low performance, they also have a small silicon area, and therefore a reasonable performance per silicon area. There are processor variants which issue and execute multiple instructions at the same time. These multiple-issue variants look ahead in the instruction stream to find instructions that can be processed in parallel by the different execution units. To increase performance, a processor may also have multiple instances of selected execution units. This results in fast execution of each program thread. However, dependencies between instructions in a thread limit the number of instructions that can be executed in parallel, leaving execution units unused, and the logic required to extract the parallel instructions requires a significant amount of silicon area and power. The routing logic to route values to and from the execution units is also significant. The result is poor efficiency, measured in performance per silicon area and performance per watt.

One type of processor that can achieve a higher performance per silicon area is known as Single Instruction Multiple Data (SIMD Processor). This type of processor operates on fixed width vectors rather than scalar values. Each instruction performs its operation on multiple scalars at a time, using vectorized execution units that are constructed from an array of scalar units arranged in separate lanes. SIMD Processors can be single-issue or multiple-issue. However, the programmer or source language compiler often cannot express the operation to be performed using vectors, in many cases utilizing only one lane of the vectorized execution units.

Another type of processor that can achieve a higher performance per silicon area is known as Very Long Instruction Word Processor (VLIW Processor), where each instruction describes the operation of all the execution units in the processor. In this way, all the execution units can operate every cycle, without the need for multiple-issuing hardware.

The simplest Multiple-issue, SIMD and VLIW processors run a single thread at a time, and may therefore be referred to as single threaded processors. Coherent Vector Threaded Processors are a kind of processor which is similar to SIMD processors in that multiple parallel registers are hardwired to multiple parallel execution units arranged in lanes, but where each lane executes a separate program thread. The bandwidth required for instruction fetch is lower than for the other types of processors since multiple threads execute the same instruction from the instruction fetch unit. Parallelism is achieved by executing multiple threads in lock-step, so the simplest form of single issue instruction sequencer is sufficient for good performance and efficiency, though Coherent Vector Threaded Processor architectures with multiple-issue and VLIW are also possible. The threads start out at the same program location, but may branch to multiple different locations, an event known as divergence. During divergence, each one or more threads branch to the same program location. The processor can issue instructions for only a limited number of divergent threads simultaneously, but will prioritize which thread to issue instructions for so that the threads end up at the same program location again, an event known as reconvergence. These processors typically enforce such reconvergent execution over a fixed number of threads, known as a warp or wavefront.

Although these processors provide useful data processing functionality, they each have their own shortcomings. Accordingly, it is desired to provide improved data processing techniques.

SUMMARY

According to a first aspect, there is provided a data processing apparatus comprising: a processor comprising a plurality of parallel lanes for parallel processing of sets of threads, each lane comprising a plurality of pipelined stages, the pipelined stages of each lane being operable to process instructions from the sets of threads; and scheduling logic operable to schedule instructions for processing by the lanes, the scheduling logic being operable to identify that one of the sets of threads being processed is to be split into a plurality of sub-sets of threads and to schedule at least two of the plurality of sub-sets of threads for processing by different pipelined stages concurrently.

The first aspect recognises that existing techniques have performance limitations because as threads within the thread set (a set or group of threads all sharing the same instruction in the instruction stream) diverge (meaning that each thread in the thread set is no longer at the same instruction in the instruction stream), scheduling of those threads becomes more problematic. In particular, in existing techniques, when divergence occurs and sub-sets are created, only one of those sub-sets may be scheduled for processing within the processor until that sub-set reaches a reconvergence point since an assessment needs to be made of when the threads may reconverge (meaning that the threads once again are at the same instruction in the instruction stream) to enable those threads to be scheduled together in order to take advantage of the parallelism provided by the processor architecture.

Accordingly, a data processing apparatus is provided. The data processing apparatus may comprise more than one parallel lane. Each parallel lane may be for processing, in parallel, an associated thread from a set of threads. Each lane may comprise more than one pipelined stage. Each pipelined stage within each lane may be operable to process instructions from the threads. Scheduling logic may be provided which schedules instructions for processing by the lanes. The scheduling logic may identify that one of the sets of threads being processed is to be split or separated into more than one sub-set of threads. The scheduling logic may then subsequently schedule the sub-sets of threads for processing together by different pipeline stages. In this way, when a thread set is split into sub-sets of threads, rather than waiting for each sub-set to be completely executed to a reconvergence point, instead multiple sub-sets may be scheduled for processing by separate pipelined stages at the same time. That is to say, if a thread set is split into two or more sub-sets, then existing techniques would need to schedule just one of those sub-sets for processing within the pipelined stages and wait until that sub-set had reached a point where it may reconverge with the other sub-set before scheduling the other sub-set. In contrast, sub-sets may be scheduled to be in the pipeline together, with each being processed by a different pipeline stage. This enables the sub-sets to be processed more quickly and enables reconvergence to be reached more rapidly than would otherwise be possible.

In one embodiment, each thread within the set of threads scheduled for processing shares at least one common instruction for parallel processing by the lanes. Hence, each thread in a set may have the same instruction to be processed.

In one embodiment, each thread within the set of threads scheduled for processing shares at least one common instruction for parallel processing by the same stage within the lanes. Hence, each thread in a set may have the same instruction being processed at any one time by the same pipelined stage, with the instruction advancing for all threads in the set in lockstep through the pipelined stages.

In one embodiment, each thread within the set of threads scheduled for processing shares a common instruction pointer value identifying the at least one common instruction for parallel processing by the lanes.

In one embodiment, each thread within the set of threads scheduled for processing is associated for processing by a corresponding one of the lanes. Accordingly, a mapping between threads and lanes may be provided, although the scheduling logic may provide this mapping dynamically during scheduling.

In one embodiment, the scheduling logic comprises storage operable to store an indication of the set of threads and each of the sub-sets of threads. Accordingly, storage may be provided, typically in the form of a thread set memory, in order to retain information related to the different thread sets.

In one embodiment, the indication of the set of threads and each of the sub-sets of threads comprises a bit mask identifying each thread associated with an instruction pointer value. Providing a bit mask helps to identify which threads all sharing the same instruction pointer value are to be scheduled for execution within which lanes.

In one embodiment, the indication of the set of threads and each of the sub-sets of threads comprises an instruction pointer value associated with each thread. Accordingly, rather than the storage being arranged by thread set, the storage may instead be arranged by thread, each of which has an associated instruction pointer value, from which the thread sets may be derived.

In one embodiment, the scheduling logic is operable to identify that the set of threads is to be split into the plurality of sub-sets of threads when different instructions are identified for parallel processing by the same stage within the lanes. Accordingly, when a divergence occurs within the set of threads causing threads within the set to be at different instructions within the instruction stream, the scheduling logic identifies that the thread set is to be split.

In one embodiment, the scheduling logic is operable to identify that the set of threads is to be split into the plurality of sub-sets of threads when a divergence in instruction pointer value occurs for at least one thread of the set of threads. Accordingly, the occurrence of divergence in the thread set can be identified by threads within the thread set having different instruction pointer values.

In one embodiment, the scheduling logic is operable to include, in each sub-set of threads, those threads sharing a common instruction pointer value identifying the at least one common instruction for parallel processing by the lanes. Accordingly, all those threads which have an identical instruction pointer value may be grouped together within the same sub-set.

In one embodiment, the scheduling logic is operable to identify that a possible divergence in instruction pointer value may occur which is identified by a divergence indicator within a thread. Accordingly, the instruction stream may be annotated to indicate that a divergence may occur in the instruction stream of the threads within the thread set.

In one embodiment, the divergence indicator comprises an ENTER_REGION instruction.

In one embodiment, the scheduling logic is operable to perform an adjustment of a reconvergence counter for the set of threads from an initial value on an occurrence of the divergence indicator. Accordingly, the reconvergence counter may indicate each possible or likely divergence, which may be useful when assessing subsequently whether reconvergence has occurred.

In one embodiment, the storage is operable to store the reconvergence counter associated with each set of threads. Hence, each thread set may have its own reconvergence counter associated therewith.

In one embodiment, the reconvergence counter comprises a depth counter.

In one embodiment, the scheduling logic is operable to identify recursively that one of the sub-sets of threads being processed is to be split into a further plurality of sub-sets of threads and to schedule at least two sub-sets of threads for processing by different pipelined stages concurrently. Accordingly, sub-sets may be further split into other sub-sets, each of which share a common instruction pointer value and those further sub-sets may be scheduled for processing concurrently, using different pipelined stages.

In one embodiment, the scheduling logic is operable to schedule any at least two sub-sets of threads which have not themselves been split recursively into further sub-sets for processing by different pipelined stages concurrently. Accordingly, the scheduling logic may schedule any of the thread sets which have not been split into further thread sets.

In one embodiment, the scheduling logic is operable to designate each sub-set of threads which has not itself been split recursively into further sub-sets as a leaf sub-set of threads and the scheduling logic is operable to schedule any at least two of the leaf sub-sets of threads for processing by different pipelined stages concurrently. Accordingly, when viewed as a hierarchical tree structure, any leaf nodes or sub-sets may be scheduled for processing concurrently by different pipelined stages.

In one embodiment, the scheduling logic to perform an adjustment of a reconvergence counter for the further sub-set of threads from an initial value on an occurrence of the divergence indicator. Accordingly, each sub-set may have a reconvergence counter associated therewith which is also adjusted when a divergence indicator is encountered within the instruction stream of that thread set. Typically, the reconvergence counter of a sub-set may inherit the value of the parent set from which it depends, which is typically adjusted further.

In one embodiment, the scheduling logic is operable to schedule any at least two of the sub-sets of threads for processing having a highest reconvergence counter. It will be appreciated that this is possible to do where either the thread sets or just the threads are recorded within the storage. In embodiments, the threads having the highest reconvergence counter value may be scheduled in preference to those with a lower reconvergence counter value.

In one embodiment, the scheduling logic is operable to prevent the set of threads from being scheduled for processing until the plurality of sub-sets of threads have reconverged again to share a common instruction pointer value. Accordingly, any threads which are not leaf thread sets may be prevented from being scheduled until those leaf thread sets have reconverged. It will be appreciated that the set of threads may itself be a sub-set of threads.

In one embodiment, the storage comprises an indication that the thread is to be prevented from being scheduled. It will be appreciated that the indication may comprise a block bit, a null of the instruction pointer value, or even a thread set bit mask which indicates that a particular thread or thread set is to be prevented from being scheduled.

In one embodiment, the scheduling logic is operable to reform a sub-set of threads when every further sub-set split from that sub-set of threads has reconverged again to share a common instruction pointer value. Accordingly, when all of the thread sub-sets have reconverged back to the same instruction pointer value, then the originating or parent thread set may be reformed. In embodiments, when the originating thread set is reformed, the entries for the thread sub-sets may be removed from the storage and the originating or parent thread set may be identified now as being schedulable.

In one embodiment, the scheduling logic is operable to reverse the adjustment of the reconvergence counter for the sub-set of threads when a possible reconvergence identified by a reconvergence indicator occurs within that sub-set of threads. Accordingly, when each reconvergence indicator is encountered within the instruction stream of the threads, the reconvergence counter may be adjusted.

In one embodiment, the reconvergence indicator comprises an EXIT_REGION instruction.

In one embodiment, the scheduling logic is operable to determine that a sub-set of threads has reached a possible reconvergence when the reconvergence counter returns to the initial value. Accordingly, through a simple comparison of the reconvergence counter it is possible to determine whether reconvergence has occurred or not.

In one embodiment, the scheduling logic is operable to reform the set of threads when every sub-set split from that set has reconverged again to share a common instruction pointer value. Reforming the threads back to the parent thread set improves the processing efficiency since more threads can be scheduled for processing by the pipelined stages.

In one embodiment, the scheduling logic is operable to reverse the adjustment of the reconvergence counter for the set of threads when a possible reconvergence identified by a reconvergence indicator occurs within that set of threads.

In one embodiment, the data processing apparatus comprises logic operable to annotate an instruction stream comprising the instructions to provide the divergence and reconvergence indicators. Accordingly, the instruction stream may be revised, modified or annotated to provide the divergence and reconvergence indicators. It will be appreciated that such annotation may be performed by either a host processor or a co-processor.

In one embodiment, the divergence and reconvergence indicators identify a single-entry single-exit region. Accordingly, the divergence and reconvergence indicators may be provided around a single-entry single-exit region to indicate potential points of divergence and convergence.

In one embodiment, the data processing apparatus comprises logic operable to annotate an instruction stream comprising the instructions to provide store and restore indicators. The store and restore indicators may be provided in the vicinity of unstructured code.

In one embodiment, the scheduling logic is operable, on occurrence of a store indicator within a set of threads, to store in alternative storage contents of the storage associated with the set of threads. Accordingly, when a store indicator is encountered the scheduling logic may store the contents of the entry in the storage associated with the set of threads being executed at a location other than the storage for subsequent use.

In one embodiment the store indicator comprises a STORE_REGION instruction.

In one embodiment, the scheduling logic is operable, on occurrence of a restore indicator, to determine whether the set of threads within which the restore indicator occurred matches the set of threads whose contents are stored in the alternative storage and, if so, to overwrite contents in the storage associated with the set of threads with the contents from the alternative storage except for the instruction pointer value. Accordingly, when a restore indicator is encountered, a comparison is made between the thread set currently being scheduled and the thread set which had its contents stored in the alternative storage and, if there is a match, the entry in the storage for the thread set being scheduled is overwritten by the entry stored in the alternative storage, with the exception of the instruction pointer value which retains the value of the thread set being scheduled. This enables the thread set to be restored to the state it was prior to any unstructured code.

In one embodiment, the scheduling logic is operable, on occurrence of a restore indicator, to determine whether the set of threads within which the restore indicator occurred matches the set of threads whose contents are stored in the alternative storage and, if not, to remove an indication of the set of threads within which the restore indicator occurred from the contents and contents associated with sub-sets of threads of the set of threads within which said restore indicator occurred prior to overwriting contents in the storage associated with the set of threads with the contents from the alternative storage except for the instruction pointer value and the indication of the set of threads. Accordingly, when the restore indication is encountered then it is determined whether the same set of threads is still being scheduled for execution. If they are not, then the currently executing threads are separated and allowed to continue being scheduled, whilst the remaining are restored to the state they were in, except for the instruction pointer value and the thread set indication.

In one embodiment the reconvergence indicator comprises a RESTORE_REGION instruction.

According to a second aspect, there is provided a data processing method of scheduling instructions for processing by a data processing apparatus comprising a plurality of parallel lanes for parallel processing of sets of threads, each lane comprising a plurality of pipelined stages, the pipelined stages of each lane being operable to process instructions from the sets of threads, the method comprising: identifying that one of the sets of threads being processed is to be split into a plurality of sub-sets of threads; and scheduling at least two of the plurality of sub-sets of threads for processing by different pipelined stages concurrently.

In one embodiment, each thread within the set of threads scheduled for processing shares at least one common instruction for parallel processing by the lanes.

In one embodiment, each thread within the set of threads scheduled for processing shares at least one common instruction for parallel processing by the same stage within the lanes.

In one embodiment, each thread within the set of threads scheduled for processing shares a common instruction pointer value identifying the at least one common instruction for parallel processing by the lanes.

In one embodiment, each thread within the set of threads scheduled for processing is associated for processing by a corresponding one of the lanes.

In one embodiment, the method comprises storing an indication of the set of threads and each of the sub-sets of threads.

In one embodiment, the indication of the set of threads and each of the sub-sets of threads comprises a bit mask identifying each thread associated with an instruction pointer value.

In one embodiment, the indication of the set of threads and each of the sub-sets of threads comprises an instruction pointer value associated with each thread.

In one embodiment, the step of identifying comprises identifying that the set of threads is to be split into the plurality of sub-sets of threads when different instructions are identified for parallel processing by the same stage within the lanes.

In one embodiment, the step of identifying comprises identifying that the set of threads is to be split into the plurality of sub-sets of threads when a divergence in instruction pointer value occurs for at least one thread of the set of threads.

In one embodiment, the method comprises including, in each sub-set of threads, those threads sharing a common instruction pointer value identifying the at least one common instruction for parallel processing by the lanes.

In one embodiment, the method comprises identifying that a possible divergence in instruction pointer value may occur which is identified by a divergence indicator within a thread.

In one embodiment, the divergence indicator comprises an ENTER_REGION instruction.

In one embodiment, the method comprises preventing the set of threads from being scheduled for processing until the plurality of sub-sets of threads have reconverged again to share a common instruction pointer value.

In one embodiment, the method comprises performing an adjustment of a reconvergence counter for the set of threads from an initial value on an occurrence of the divergence indicator.

In one embodiment, the step of storing comprises storing the reconvergence counter associated with each set of threads.

In one embodiment, the reconvergence counter comprises a depth counter.

In one embodiment, the step of identifying comprises identifying recursively that one of the sub-sets of threads being processed is to be split into a further plurality of sub-sets of threads and the step of scheduling comprises scheduling at least two sub-sets of threads for processing by different pipelined stages concurrently.

In one embodiment, the step of scheduling comprises scheduling any at least two sub-sets of threads which have not themselves been split recursively into further sub-sets for processing by different pipelined stages concurrently.

In one embodiment, the method comprises designating each sub-set of threads which has not itself been split recursively into further sub-sets as a leaf sub-set of threads and the step of scheduling comprises scheduling any at least two of the leaf sub-sets of threads for processing by different pipelined stages concurrently.

In one embodiment, the method comprises performing an adjustment of a reconvergence counter for the further sub-set of threads from an initial value on an occurrence of the divergence indicator.

In one embodiment, the step of scheduling comprises scheduling any at least two of the sub-sets of threads for processing having a highest reconvergence counter.

In one embodiment, the method comprises reforming a sub-set of threads when every further sub-set split from that sub-set of threads has reconverged again to share a common instruction pointer value.

In one embodiment, the method comprises reversing the adjustment of the reconvergence counter for the sub-set of threads when a possible reconvergence identified by a reconvergence indicator occurs within that sub-set of threads.

In one embodiment, the reconvergence indicator comprises an EXIT_REGION instruction.

In one embodiment, the method comprises determining that a sub-set of threads has reached a possible reconvergence when the reconvergence counter returns to the initial value.

In one embodiment, the method comprises reforming the set of threads when every sub-set split from that set has reconverged again to share a common instruction pointer value.

In one embodiment, the method comprises reversing the adjustment of the reconvergence counter for the set of threads when a possible reconvergence identified by a reconvergence indicator occurs within that set of threads.

In one embodiment, the method comprises annotating an instruction stream comprising the instructions to provide the divergence and reconvergence indicators.

In one embodiment, the divergence and reconvergence indicators identify a single-entry single-exit region.

In one embodiment, the method comprises annotating an instruction stream comprising the instructions to provide store and restore indicators.

In one embodiment, the method comprises, on occurrence of a store indicator within a set of threads, storing in alternative storage contents of the storage associated with the set of threads.

In one embodiment the store indicator comprises a STORE_REGION instruction.

In one embodiment, the method comprises, on occurrence of a restore indicator, determining whether the set of threads within which the restore indicator occurred matches the set of threads whose contents are stored in the alternative storage and, if so, overwriting contents in the storage associated with the set of threads with the contents from the alternative storage except for the instruction pointer value. It will be appreciated that corresponding store and restore indicators may be identified using some form of identifier to match the two and so match the entries in the storage and alternative storage.

In one embodiment, the method comprises, on occurrence of a restore indicator, determining whether the set of threads within which the restore indicator occurred matches the set of threads whose contents are stored in the alternative storage and, if not, removing an indication of the set of threads within which the restore indicator occurred from the contents and from contents associated with sub-sets of threads of the set of threads within which said restore indicator occurred prior to overwriting contents in the storage associated with the set of threads with the contents from the alternative storage except for the instruction pointer value and the indication of the set of threads.

In one embodiment the reconvergence indicator comprises a RESTORE_REGION instruction.

According to a third aspect, there is provided a computer program product operable, when executed on a computer, to perform the method steps of the second aspect.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function. In particular, where a feature comprises logic operable to provide a function, it will be appreciated that this encompasses circuitry configured to provide that function.

BRIEF DESCRIPTION OF THE DRAWINGS

Embodiments of the present invention will now be described further, with reference to the accompanying drawings, in which.

DESCRIPTION OF THE EMBODIMENTS

General Architecture

Figure 1A:
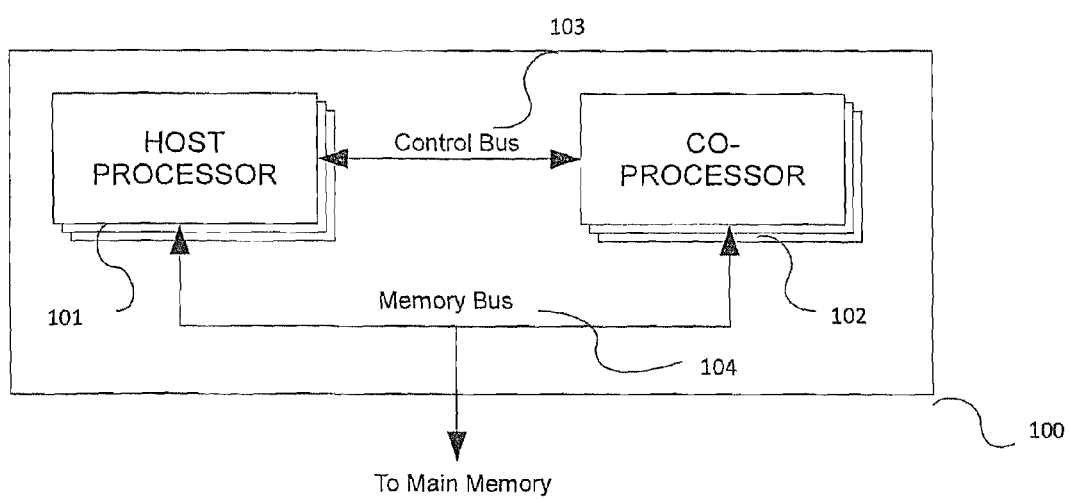
FIG. 1a illustrates an embodiment of a data processing apparatus.

FIG. 1a illustrates an embodiment of a data processing apparatus 100, comprising host processors 101 and co-processors 102 communicating over a control bus 103 and a memory bus 104. Whilst the illustration shows multiple host processors 101 and co-processors 102, it will be appreciated that the data processing system 100 may include zero or more host processors 101 and one or more co-processors 102.

The host processor 101 is a processor optimized for single-threaded processing. It can be a standard single or multi-core central processing unit (CPU), which may or may not use the same instruction set as the co-processor 102, or it may be omitted. If omitted, the co-processor 102 will perform the host-processor's 101 tasks.

In one embodiment, the co-processor 102 is a Coherent Vector Threaded processor comprising any of the features of a reconvergence mechanism described in more detail below. The host processors 101 and co-processors 102 have a control communication link, here illustrated in the form of a control bus 103, which provides the host processor 101 with a channel to reset, configure, start and stop the co-processors 102. In addition, the host processors 101 and the co-processors 102 may have the ability to send each other interrupts and simple messages though the control bus 103.

The host processors 101 and co-processors 102 are, together or individually, coupled to at least one memory bus 104, which provides access to a main memory (not shown), usually within another computer chip, but possibly on the same chip or in another form of storage.

Processor Architecture

Figure 1B:
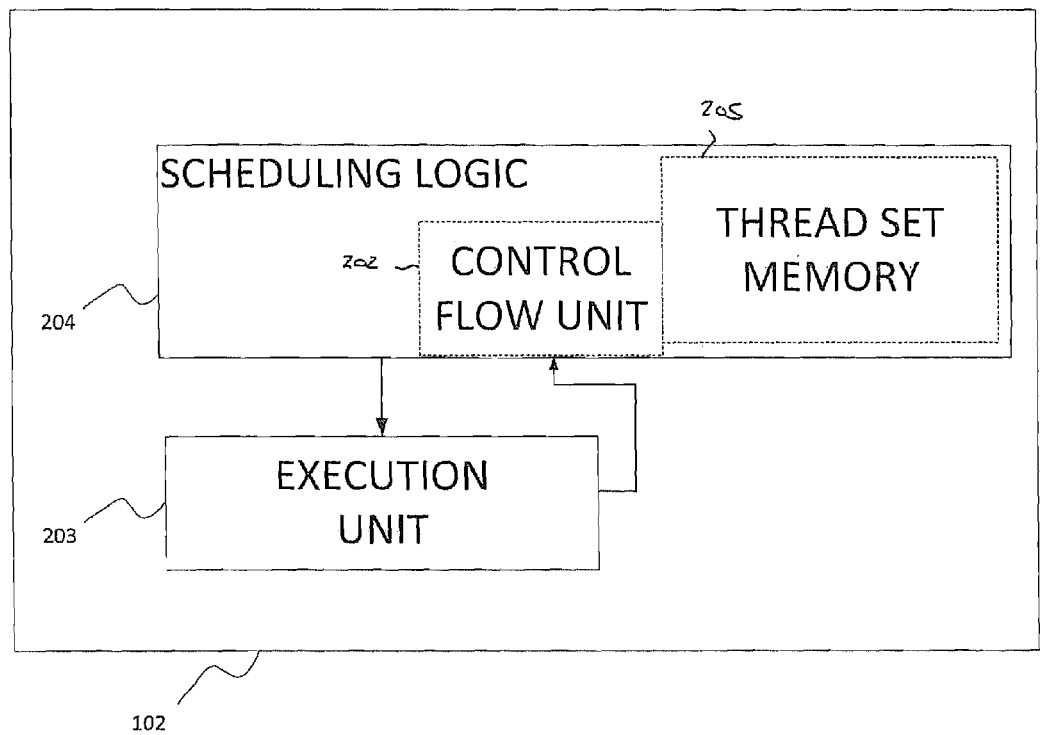
FIGS. 1b and 1c illustrate the main components of a co-processor of FIG. 1a in more detail.

FIG. 1b illustrates the main components of the co-processor 102 in more detail. A multi-lane, pipelined execution unit 203 is provided. Coupled with the execution unit 203 is scheduling logic 204 which schedules instructions for processing by the execution unit 203. The scheduling logic 204 comprises a thread set memory 205 which stores information relating to threads to be scheduled for processing by the execution unit 203. A control flow unit 202 is provided which stores, updates and interrogates information in the thread set memory 205.

Figure 1C:
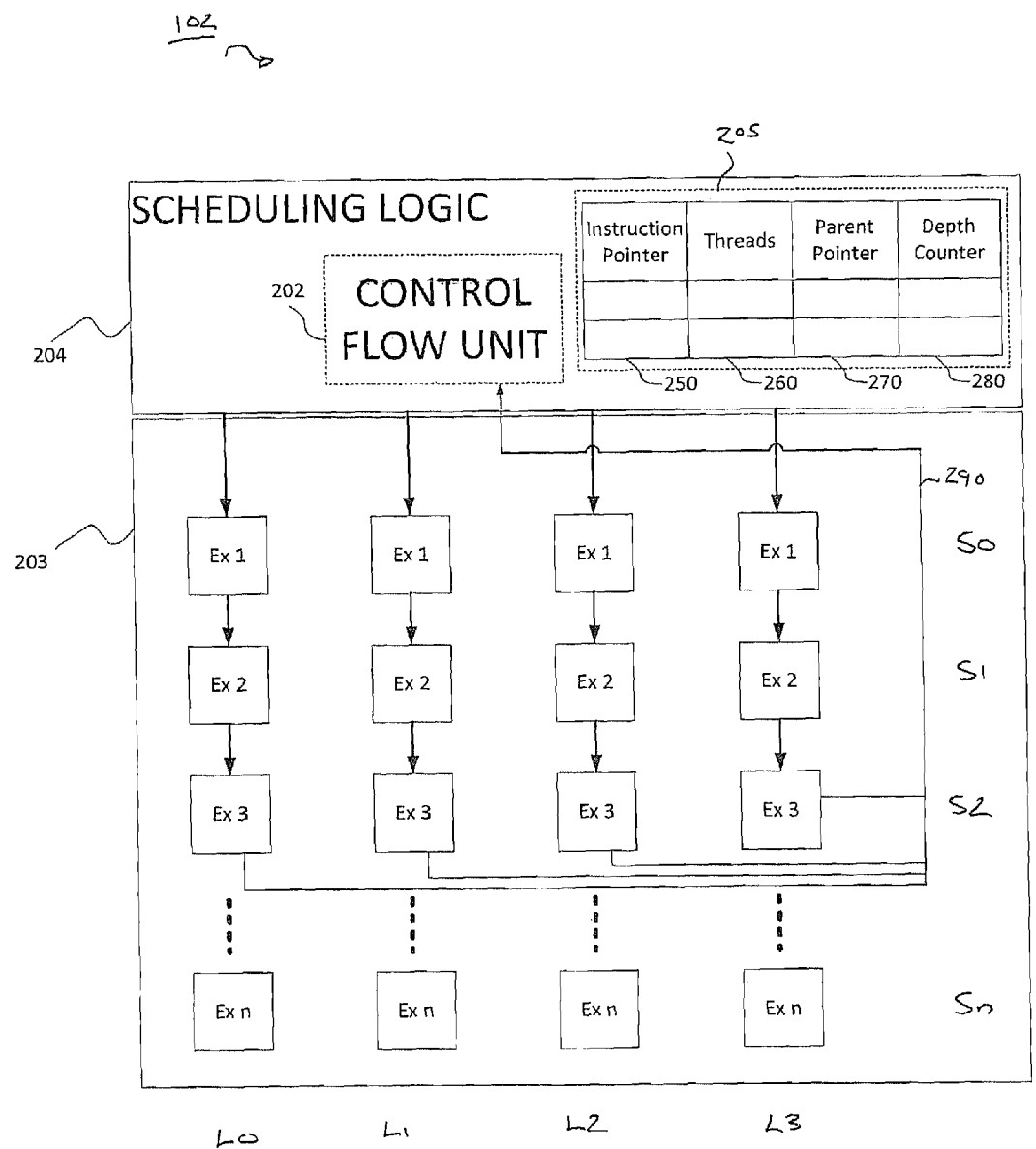

FIG. 1c illustrates the arrangement of the co-processor 102 in more detail. In this example, the execution unit 203 includes four lanes L0 to L3, each of which may receive instructions. Each lane L0 to L3 is made up of a plurality of pipelined stages, in this example pipelined stages S0 to Sn. Such an arrangement is used to enable parallel processing to be performed in computationally-intensive applications such as, for example, image or database processing where the same sequence of instructions are performed on multiple data sets. Typically, in a four lane arrangement, a warp of four threads forming a single thread set, where each thread within the thread set sharing the same instruction pointer value, is scheduled for execution by each of the four lanes concurrently. In other words, the same instruction is scheduled for execution four times (in each of the four lanes), and these four instructions flow together through the pipelined stages. This enables four different data sets to be processed concurrently. It will, of course, be appreciated that more or fewer lanes may be provided and more or fewer pipelined stages may be provided.

The scheduling logic 204 retains (or accesses in other embodiments) information about the current state of the thread set in order to make decisions on which threads to schedule for processing at any particular time. In this example, the information is stored in a thread set memory 205 which, in this example is implemented as a single table although it will be appreciated that other implementation are possible where the information is stored in a more distributed or compact form.

The execution unit 203 also includes a path 290 over which certain characteristics of the instructions being executed within the pipelined stages are reported to a control flow unit 202. In this example, the path 290 is provided at stage S2, but it will be appreciated that the path 290 may be provided elsewhere, depending on the particular implementation. For example, the path 290 is used to report whether a divergence in instruction pointer value occurs for a thread set being executed by pipelined stage S2, or whether a particular instruction is being processed. The control flow unit 203 uses this information to update the thread set memory 205.

The thread set memory 205 contains a number of entries to identify both the thread sets and their relationships to assist the scheduling logic 204 when the scheduling instructions to be issued to each lane L0 to L3 of the execution unit 203. In particular, the thread set memory 205 includes an entry for each thread set or thread sub-set. In this example, each entry contains an instruction pointer field 250, a thread set mask field 260, a parent pointer field 270 and a depth counter field 280. The instruction pointer field 250 identifies, for each entry, the next instruction to be executed by the threads in the thread set identified for that entry. The thread set mask field 260 identifies the threads which are currently executable, as well as the lanes within which they may be executed (although in other embodiments the lane mapping is determined by the scheduler). The parent pointer field 270 identifies whether the entry has a parent thread set and, if so, which entry in the table is that parent thread set. The depth counter field 280 is used to reduce the number of entries in the table which may otherwise be made if a possible divergence is indicated within a thread (which would otherwise lead to further entries requiring to be made within the instruction thread set memory 205). Accordingly, the provision of the depth counter field 280 enables a degree of compression of entries within the instruction thread set memory 205 to be achieved and may also be used in other embodiments to selecting which thread set to schedule.

Code Annotation

In order to utilise the functionality of the thread set memory 205 to provide a reconvergence mechanism, the code being executed by the co-processor 102 needs to provide certain information relating to the existence of possible divergent points or convergent points in the control flow so that an assessment of the threads making thread sets and whether those thread sets can be scheduled for execution can be made. Typically, this is achieved by inserting additional instructions into the code or by annotating the existing instructions to identify these points.

In embodiments where the host processor 101 and the co-processor 102 are implementing different instruction sets, code that is to be run on the co-processor will re-compiled from the host processor's to the co-processor's instruction set on demand during run-time through a process known as "Just-in-Time compilation" (JIT-compilation).

JIT-compilation refers to re-compiling compiled instructions from the host-processor's instruction set, or another instruction set, to the co-processors instruction set. This is achieved by translating the instructions directly into their equivalent or a series of instructions achieving the same result, remapping registers where required. It can involve translating the code into an abstract program representation as an intermediate step, such as a directed acyclic graph, a single assignment form register allocation or an intermediate language. In an alternative embodiment, the code exists for two instruction sets before the program is run, and the distinction between the two is explicit, but requires no JIT-compilation. The code for the two instruction sets is compiled so that data is laid out and accessed in the same way, thereby allowing functions in either of the two versions to operate on the same data structures. The two compiled versions are referred to as Compatibly Compiled Instruction Streams (CCISs). Both these embodiments, JIT-compiling from a compiled instruction set to the co-processor's instruction set or alternatively creating the CCISs, enable seamless handover of tasks between the host-processor and the co-processor. Sections of code that are intended for the host-processor, but which cannot be re-compiled for the co-processor or are identified as inefficient on the co-processor, can run on the host-processor instead. A seamless integration is also available in the simple case where both host-processor and co-processor use the same instruction set.

In one embodiment, compilation, including JIT-compilation or generation of the CCIS, may also include insertion of additional instructions or reconfiguration of the program flow to improve performance or execution flow on a CVT processor. Inserted instructions can include, for example, ENTER_REGION, EXIT_REGION, STORE_REGION, RESTORE_REGION, as explained in further detail below.

Single Entry Single Exit (SeSe) Regions

As part of the compilation, Single Entry Single Exit (SeSe) regions in the code are identified. SeSe regions are identified by applying the following set of criteria to the Instruction Stream:—Instruction a is the entry and instruction b the exit to a SeSe Region if:

Every control flow path from the first Instruction in the overall control flow to instruction b also reaches instruction a before Every path from Instruction a to the last Instruction in the overall control flow also reaches instruction b Whenever the control flow reaches a it must reach b before being able to reach a again Whenever the control flow reaches b it must reach a before being able to reach b again.

The overall control flow refers to the order in which instructions are executed. First and last instructions refer to the first and the last Instruction that can be executed in the code being compiled. In embodiments, trivial SeSe Regions, where a and b are the same instruction or without control flow instructions, are not relevant. Furthermore, a SeSe region that is just an extension of another SeSe region, without at least one additional control flow instruction is also not relevant. A SeSe region will be used to refer to SeSe Regions where #b, containing control flow instructions and not being a simple extension of another SeSe region without additional control flow instruction.

This definition of SeSe regions is based on two publications which are hereby incorporated by reference in their entirety: Richard Johnson, David Pearson, Keshav Pingali, *The Program Structure Tree: Computing Control Regions in Linear Time* (1994) and by the same authors, *Finding Regions Fast: Single Entry Single Exit and Control Regions in Linear Time* (1993).

It will be appreciated that alternative identification methods for SeSe regions can also be utilized. Also, a SeSe region can contain another SeSe region and share entry point a or exit point b. Furthermore, when writing the code, or during compilation, the Instruction Stream can be rewritten to equivalent versions with identical functionality in order to change the number of SeSe regions in the Instruction Stream.

Multiple Entry And Multiple Exit (MeMe) Regions

The rules for SeSe regions defined above do not always apply to all regions within the Instruction Stream. Regions of the code that have more than one entry and/or more than one exit are referred to multiple entry and multiple exit regions. In one embodiment, multiple entry and multiple exit regions, and all regions they contain, are ignored for the purpose of reconvergence. In this case, only the surrounding SeSe region is considered. In another embodiment, the compiler will rewrite multiple entry and multiple exit regions into SeSe regions by changing the instructions. Methods available for rewriting unstructured code flow with multiple entry and multiple exit regions have been summarized by F. Zhang and E. H D'Hollander, Using hammock graphs to structure programs. *IEEE Trans. Softw. Eng.*, pages 231-245 2004 which is hereby incorporated by reference in its entirety.

Multiple entry or multiple exit regions may also be avoided during the code generation by changing the way a program is written, for example by avoiding using the unstructured control flow statements described below. After the SeSe regions have been identified, special instructions for reconvergence as mentioned below, are inserted into the Instruction Stream. If multiple SeSe regions are entered or exited at the same Instruction, then either multiple reconvergence instructions are inserted, or a version of the reconvergence instruction that includes a repeat count is inserted.

During execution of the Instruction Stream a reconvergence mechanism ensures that threads that have been executing in lockstep and have diverged into different paths reconverge typically after as few instructions as possible. This reconvergence is possible when the threads reach the same point in the Instruction Stream again. This ensures that the execution lanes have the highest possible utilization. In one embodiment, the point where threads reconverge is identified by the exit of a SeSe region. In another embodiment, the co-processor 102 will prioritize the threads that are still inside a SeSe region, but may still allow threads to execute beyond the region exit without complete reconvergence, for example while the other threads are stalled and the processor is idle.

SeSe Region Entries and Exits

The location of SeSe region entries and exits are specified using a set of reconvergence instructions. The parameters to these instructions may be in the form of immediate values, they may be stored in registers or in memory, or they may be derived in some other way based on the current thread's state and instruction stream.

In a one embodiment, only one additional instruction is used: ENTER_REGION [reconv.address]. The instruction is inserted at the place where the region starts, and reconv.address is a parameter which gives the address in the Instruction Stream where the region ends.

In another embodiment, one instruction is used to mark the point of entry, and another to mark the point of the exit from the region: ENTER_REGION [id], EXIT_REGION [id] where id is a parameter that identifies the SeSe region. Depending on the underlying architecture, the parameter may be omitted. The id may also refer to a memory location where additional information is stored. In one embodiment, regions with more than one entry and exit may be supported in limited cases by identifying corresponding ENTER_REGION and EXIT_REGION through the id.

The identification of SeSe regions as outlined above is sufficient to support structured program flow, such as but not limited to the following instructions (described as C and C++ examples but which will also equally apply to their corresponding implementation in any other programming language):
  if-then-else statements
  do-while or for-loops
  function calls
  indirect function calls (where destination is unknown at compile-time and may be different across lanes)

To support popular programming languages, such as C and C++, it is also desirable to support a certain set of unstructured control flow statements, such as, but not limited to:
  continue
  break
  return
  goto
  setjump/longjump
  try/catch and throw In one embodiment, they will be partially or fully enabled by the compiler by rewriting the resulting multiple entry and/or multiple exit regions into SeSe regions as described above. In another embodiment, the following instructions are inserted into the Instruction Stream for the purpose of handling aforementioned instructions:

STORE_REGION [location]

This instruction records the region state of the executing thread(s), and associates it with the given location. In one embodiment, location is a pointer to memory. In another embodiment, location is a reference to the processor register containing a pointer to memory. In another embodiment, location is a key into a hash-map based data storage and retrieval unit. The location is used to record the region hierarchy for an unstructured jump destination, and allows the processor to construct the correct region state when such an unstructured jump is performed. The STORE_REGION instruction does not have to be located at the jump destination, but it must be at the same place in the region hierarchy. For example, it can be executed before a for-loop to prepare for the fact that a break instruction inside the for-loop might perform an unstructured jump to the instruction following the for-loop.

RESTORE_REGION [location]

This instruction restores the region state of the executing thread(s) from the given location. Location refers to a region state stored by a corresponding STORE_REGION instruction, as mentioned in the exemplary embodiments described above. STORE_REGION and RESTORE_REGION instructions are used to perform unstructured jumps within an otherwise structured part of the program without disrupting the reconvergence logic.

In another embodiment, ENTER_REGION, EXIT_REGION, their parameters, and optionally STORE_REGION and RESTORE_REGION with their parameters, are encoded as part of another instruction. One or more bits of the instruction are reserved and used for the reconvergence instructions and its parameters. In another embodiment, where the Instruction Stream uses Very Large Instruction Word (VLIW) instructions that encode several operations together, ENTER_REGION, EXIT_REGION, their parameters, and optionally STORE_REGION and RESTORE_REGION with their parameters, are encoded inside these VLIW instructions. One or more bits of the instruction are reserved and used for the reconvergence instructions and their parameters.

The implementation described below describes the reconvergence mechanism with ENTER_REGION, EXIT_REGION, STORE_REGION and RESTORE_REGION inserted as discrete instructions. The description presented below applies equally to all cases where the ENTER_REGION, EXIT_REGION and/or STORE_REGION, RESTORE_REGION are encoded as part of other instruction(s).

In one embodiment, the compiler rewrites unstructured code, identified by multiple entry and multiple exit regions, to SeSe regions, as mentioned above. In another embodiment, STORE_REGION and RESTORE_REGION instructions are inserted to take care of unstructured branches as detailed below. These branches can then be ignored when identifying SeSe regions in the pre-processing step, allowing SeSe regions to be found, and reconvergence to be applied even in the presence of unstructured control flow.

The STORE_REGION instruction is inserted by the compiler in parts of the Instruction Stream with unstructured code flow, as in the examples given below:

| | |
|---|---|
| Setjump | STORE_REGION is inserted as part of the setjump function instructions in the Instruction Stream |
| Try | STORE_REGION is inserted together with the instructions added to the Instruction Stream by the try keyword |
| Return/break/continue | STORE_REGION is inserted after the ENTER_REGION instruction of the region that contains the next instruction executed after the return, break or continue |
| Goto | STORE_REGION is inserted after the ENTER_REGION instruction of the region that contains the next instruction executed after the goto. This can only be done if it is certain that the location of the STORE_REGION will be executed before the goto instruction. If this is not the case, the STORE_REGION/RESTORE_REGION approach cannot be used. |

The RESTORE_REGION instruction restores the region state info information for the thread set executing the instruction as if the thread set never progressed past the corresponding STORE_REGION instruction. The examples below illustrate the logic:

| | |
|---|---|
| Longjump | RESTORE_REGION is inserted as part of the longjump function instructions in the Instruction Stream |
| Catch | RESTORE_REGION is inserted together with the instructions added to the Instruction Stream by the catch keyword |
| Return/break/continue | RESTORE_REGION is inserted together with the instructions added to the Instruction Stream by the return, break or continue keyword |
| Goto | RESTORE_REGION is inserted together with the instructions added to the Instruction Stream by the goto keyword. This can only be done if it is certain that the location of the STORE_REGION will be executed before the goto instruction. If this is not the case, the STORE_REGION/RESTORE_REGION approach cannot be used. |

Figure 2:
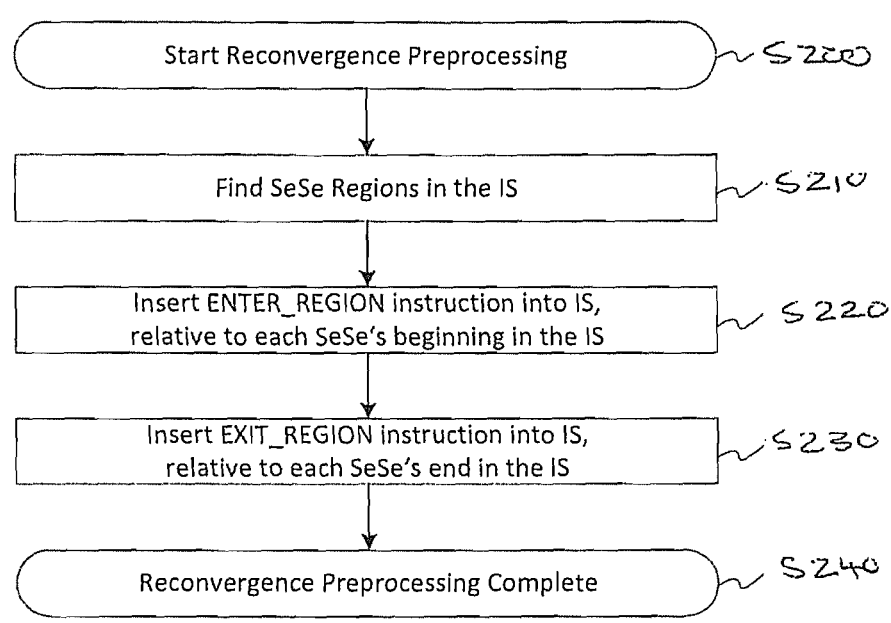
FIG. 2 illustrates an overview of the steps taken during the annotation of the code to be executed by the processor according to one embodiment when identifying SeSe regions.

FIG. 2 illustrates an overview of the steps taken during the annotation of the code to be executed by the processor 102 according to one embodiment when identifying SeSe regions. At step S200, reconvergence pre-processing begins. At step S210, all SeSe regions in the instruction stream are identified. At step S220, an ENTER_REGION instruction is entered into the instruction stream at a position which is relative to each SeSe starting point in the instruction stream. At step S230, an EXIT_REGION instruction is inserted into the instruction stream at a position relative to each SeSe end in the instruction stream. At step S240, reconvergence pre-processing is complete. It will be appreciated that a similar series of steps may be taken to identify MeMe regions and insert STORE_REGION/RESTORE_REGION instructions into the instruction stream.

Thread Set Memory

Example Operation

Figure 3A:
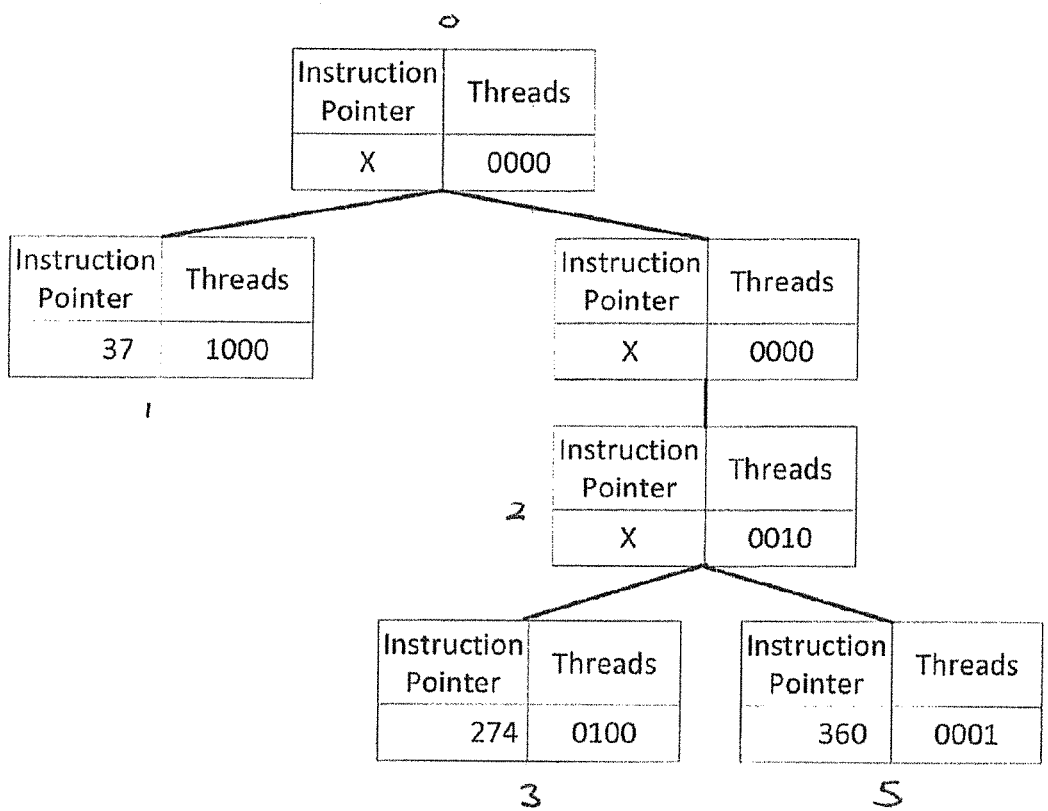
FIG. 3a illustrates an example content of a thread set memory, together with a conceptual diagram illustrating a thread set hierarchical tree structure defined by the content of the thread set memory.

Returning now to the operation of the scheduling logic 204, FIG. 3a illustrates an example content of the instruction thread set memory 205, together with a conceptual diagram illustrating a thread set hierarchical tree structure defined by the content of the instruction thread set memory 205. The content of the instruction thread set memory 205 is derived from an example instruction flow illustrated in FIG. 3b and the operation of the control flow unit 202 illustrated in FIG. 3c.

Initialisation

Figure 3B:
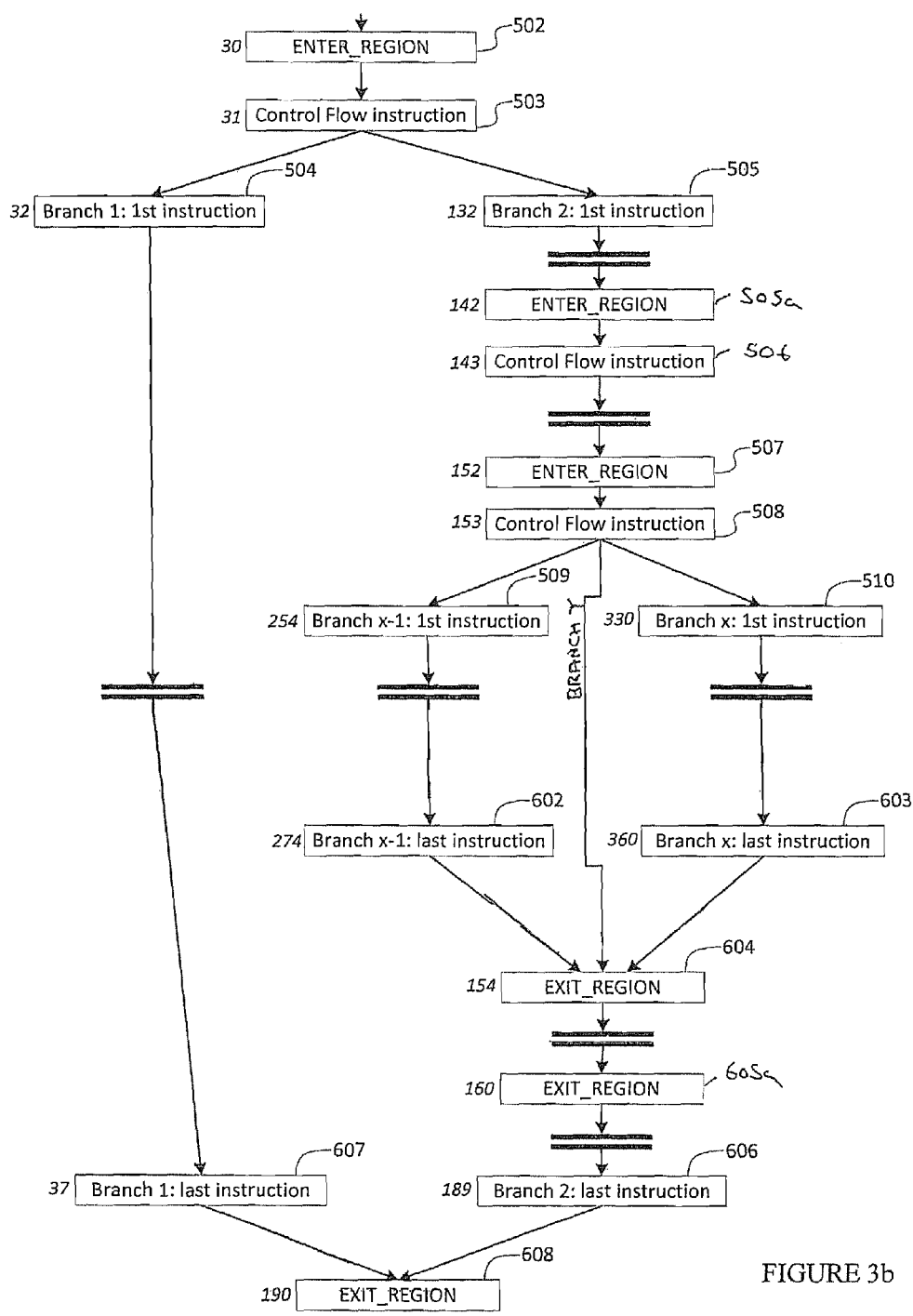
FIG. 3b an example instruction flow.

As shown in FIG. 3b, code is initiated and an initial warp of 4 threads is identified as a root thread set where the same instruction is to be executed at the same time within every lane L0 to L3 of the execution unit 203. Accordingly, a root entry (entry 0) is made in the thread set memory 205. The thread set field in this example is a bit mask. In this example, the thread set field for entry 0 is set at 1111 to indicate that the same instruction is to be scheduled for processing within each of the four lanes concurrently.

In embodiments, the value of the thread set field may be stored in a manner other than a bit mask such as, for example, a pointer to memory which indicates the thread set. In embodiments, rather than each entry in the thread set memory being associated with a particular thread set, instead each thread may be individually identified as an entry in the thread set table. Optionally, in this arrangement, the thread set value may be omitted because the memory stores the information by thread individually. The instruction pointer field 250 indicates the next instruction to be scheduled for each thread in the thread set. Given that this is the root thread set, the value of the parent pointer field 270 is set to X to indicate a null value and the depth counter is set to 0.

Figure 3C:
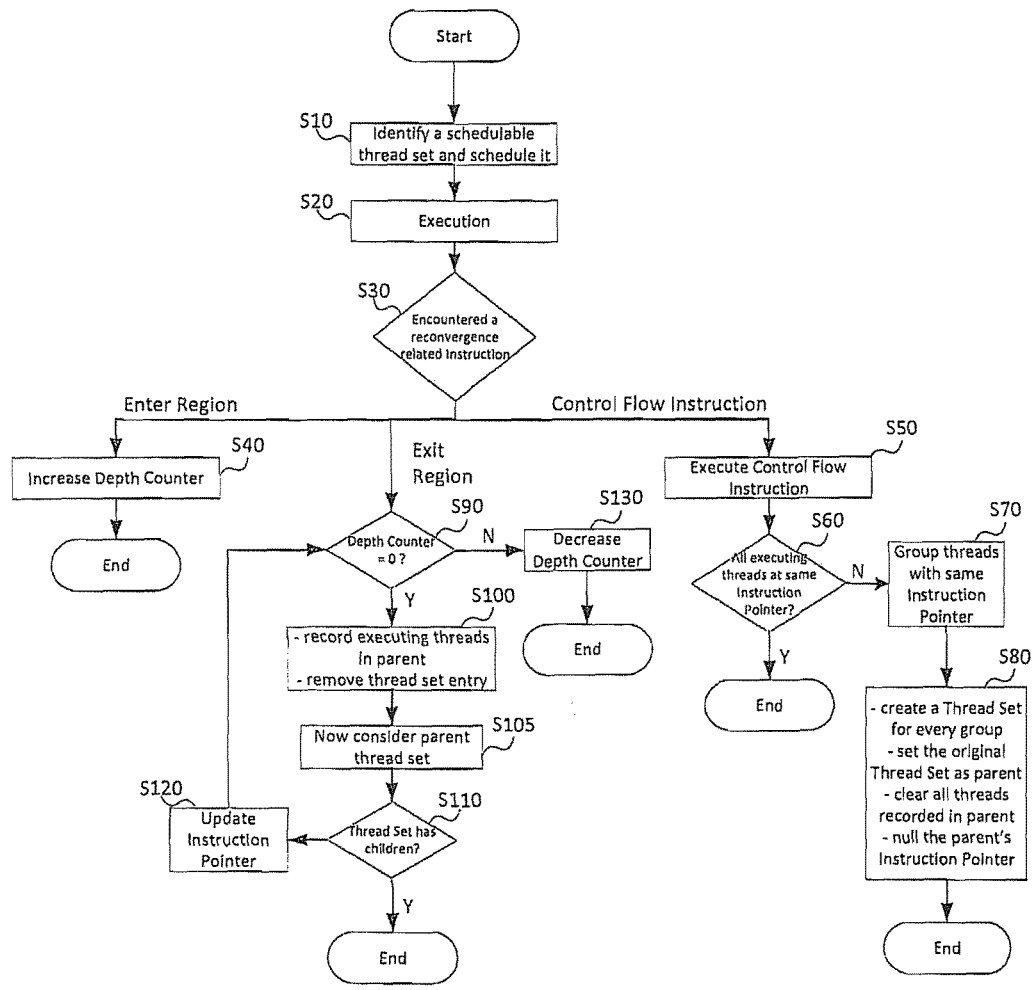
FIG. 3c illustrates an operation of the scheduling logic.

Turning now to FIG. 3c, at step S10, the scheduling logic 204 identifies the root thread set at entry 0 and each of the four (identical) instructions in the thread set are scheduled for concurrent execution within the four lanes. At step S20, the four instructions flow through the pipelined stages until they retire. The scheduling logic 204 determines whether it is necessary for each instruction to fully retire prior to updating the instruction pointer field 250 for that thread set and prior to scheduling the next instruction in the thread set. It will be appreciated that at step S20 an instruction may be fully executed, or may be partially or fully decoded for execution thereafter. It will also be appreciated that such decoding may be performed at any suitable location.

In embodiments, the thread sets may be scheduled from one or more different warps. Where different warps are utilized, then the thread set warp is indicated in the thread set memory 205 using, for example, a warp field or other annotation. Alternatively, where multiple warps are reported, then each warp may be provided with its own thread set memory or some memory.

Thread Divergence—Creation of Branches 1 and 2

When the root thread set reaches the ENTER_REGION instruction 502, and this instruction is executed at step S20 by stage S2 of the execution unit 203, then this it is indicated to the control flow unit 202 which determines at step S30 that it has encountered a divergence/reconvergence-related instruction. In this example, it is determined that an ENTER_REGION instruction has been encountered and so at step S40, the value of the depth counter field 280 is increased by 1 to 1 and the instruction continues to be executed.

The occurrence of the control flow instruction 503, it is detected at step S30 and the instruction is continued to be executed at step S50.

At step S60 it is determined that the instruction pointer value for the instruction within lane L0 diverges from the instruction pointer value for lanes L1 to L3.

At step S70, the thread for lane L0 is formed into one group and the threads for lanes L1 to L3 are formed into another group.

Accordingly, at step S80, a new entry is made in the instruction thread set memory 205 for each group, in this example entry 1 and entry 2. Entry 1 includes an instruction pointer value of 32 (the next instruction 504 for that thread (sub)set), a thread set value of 1000 (indicating just a single thread in the thread (sub)set), a parent value of 0 (indicating the root thread set) and depth counter value of 0. Entry 2 has an instruction pointer value of 132 (the next instruction 505 for that thread (sub)set), a thread set value of 0111 (indicating three threads in the thread (sub)set), a parent pointer value of 0 (indicating the root thread (sub)set) and a depth counter value of 0. In embodiments, the parent pointer may be omitted. In embodiments, a child thread counter, counting the number of threads in the thread set of the parent node prior to divergence, may be provided. In this example, the child thread counter for entry 0 would be set to 4 (since the thread set of entry 0 was set to 1111 prior to divergence). The thread set value of the parent (the root thread set) is cleared to 0000 and the instruction pointer value of the parent is nulled.

Now the scheduling logic 204 will cease to schedule the root thread set since it is no longer schedulable, but will now instead schedule both of the thread (sub)sets identified by entries 1 and 2 in the thread set memory 205. In fact the scheduling logic 204 is free to schedule any thread (sub)set which has no further sub-sets (which is analogous to leaf nodes as illustrated in FIG. 3a). Schedulable thread (sub)sets may also be identified by the absence of a null value in the instruction pointer field 250. Although in this example the control flow units 202 determines from the instruction pointer field 250 whether a thread set is schedulable, it will be appreciated that instead the nulling or annotation of the instruction pointer field may be omitted and instead a check may be made of whether a thread set has other thread sets or nodes pointing to it with their parent pointers. In embodiments, where a decision is to be made between different thread (sub)sets for scheduling, the scheduling logic 204 may prioritise those with a higher value in the depth counter field 280.

Hence, the thread (sub)set identified by entry 1 and then the thread (sub)set identified by entry 2 in the instruction thread set memory 205 are scheduled so that thread (sub)set identified by entry 1 flows through the pipeline stages of lane 0, followed by thread (sub)set identified by entry 2 in another pipelined stage of lanes L1 to L3. In other words, the thread (sub)set identified by entry 1 is issued to lane 0 of stage S0 first and, in a subsequent cycle, the thread (sub)set identified by entry 2 is issued to lanes L1 to L3 of stage S0 so that the two (sub)sets are then concurrently processable (albeit at different stages of the pipeline). This should be contrasted to existing arrangements which would need to wait until thread (sub)set identified by entry 1 has reached a reconvergence point prior to the thread (sub)set identified by entry 2 being issued to the pipeline. This concurrent processing provides for significant performance improvements.

The scheduling logic 204 continues to schedule instructions for the thread (sub)set identified by entry 1 to lanes L1 to L3 and for the thread (sub)set identified by entry 2.

Potential Thread Divergence—No Branch

After a sequence of instructions (denoted by parallel lines in FIG. 3b) when the thread (sub)set identified by entry 2 reaches the ENTER_REGION instruction 505a, and this instruction is executed at step S20 by stage S2 of the execution unit 203, then this it is indicated to the control flow unit 202 which determines at step S30 that it has encountered a divergence/reconvergence-related instruction. In this example, it is determined that an ENTER_REGION instruction has been encountered and so at step S40, the value of the depth counter field 280 is increased by 1 to 1 and the instruction continues to be executed.

The occurrence of the control flow instruction 506, it is detected at step S30 and the instruction is continued to be executed at step S50.

At step S60, it is determined that all threads in the (sub)set are at or are set to the same instruction pointer value.

The scheduling logic 204 continues to schedule instructions for the thread (sub)set identified by entry 1 to lanes L1 to L3 and for the thread (sub)set identified by entry 2.

Further Thread Divergence—Creation of Branches X−1, Y and X

When the thread (sub)set identified by entry 2 reaches the ENTER_REGION instruction 507, and this instruction is executed at step S20 by stage S2 of the execution unit 203, then this it is indicated to the control flow unit 202 which determines at step S30 that it has encountered a divergence/reconvergence-related instruction. In this example, it is determined that an ENTER_REGION instruction has been encountered and so at step S40, the value of the depth counter field 280 is increased by 1 to 2 and the instruction continues to be executed.

The occurrence of the control flow instruction 508 is detected at step S30 and the instruction is continued to be executed at step S50.

At step S60 it is determined that the instruction pointer value for the instruction within lane L1 diverges from the instruction pointer value for lane L2, which also diverges from the instruction pointer value for lane L3.

At step S70, the thread for lane L1 is formed into one group, thread for lane L2 is formed into one group and the thread for lane L3 is formed into one group.

Accordingly, at step S80, a new entry is made in the thread set memory 205 for each group, in this example entry 3, entry 4, and entry 5.

Entry 3 includes an instruction pointer value of 254 (the next instruction 509 for that thread (sub)set), a thread set value of 0100 (indicating just a single thread in the thread (sub)set), a parent value of 2 and depth counter value of 0. Entry 4 has an instruction pointer value of 154 (the next instruction 604 for that thread (sub)set), a thread set value of 0010 (indicating just a single thread in the thread (sub)set), a parent pointer value of 2 and a depth counter value of 0. Entry 5 has an instruction pointer value of 330 (the next instruction 510 for that thread (sub)set), a thread set value of 0001 (indicating just a single thread in the thread (sub)set), a parent pointer value of 2 and a depth counter value of 0. The thread set value of the parent (the thread set identified by entry 2) is cleared to 0000 and the instruction pointer value of the parent is nulled. In this example, the child thread counter for entry 2 would be set to 3 (since the thread set of entry 2 was set to 0111 prior to divergence).

Now the scheduling logic 204 will cease to schedule the root thread set and the thread (sub)set identified by entry 2 since these are no longer schedulable, but will now instead schedule all of the thread (sub)sets identified by entries 1, 3, 4 and 5 in the thread set memory 205 (the unblocked, leaf nodes).

Hence, the scheduling logic 204 remains free to schedule the thread sub-set for branch 1 (identified by entry 1 in the thread set memory 201), branch X−1 (identified by entry 3 in thread set memory 201), branch Y (identified by entry four in the thread set memory 201) and/or branch X (identified by entry 5 in the thread set memory 201).

Branch Y Reconvergence

When executing branch Y, an EXIT_REGION instruction 604 is identified by the control flow unit 202 at step S90. The control flow unit 202 determines from the thread set memory 205 that the depth counter value for the corresponding entry (entry 4) is set at 0. Accordingly, at step S100, entry 4 is deleted from the thread set memory 201 and the threads identified by the thread set value are set in the parent entry. In this example, the thread set value in entry 2 is set to 0010 to indicate that the thread being executed by lane L2 has reached a reconvergence point.

At step S105 the content of the parent entry is considered (in this example, entry 2). At step S110 it is determined that there are still thread sets pointing to the parent entry (entry 2) and so the parent entry still has child nodes and so it is still not possible for the scheduling logic 204 to schedule that thread set (entry 2) for execution. This can be done by either checking the parent pointer value in every entry within the thread set memory to see if they refer to entry 2, by storing a mask which indicates the thread set value for this entry prior to any further divergence occurring (in this case 0111) or by comparing the number of threads that have reached a reconvergence point (i.e. threads 0010 indicated by the thread set value=1 thread) with the child node counter of the parent entry (which is set at 3).

FIG. 3a shows the state of the thread set memory 205 prior to the execution of the branch 1 last instruction 607, the branch X-1 last instruction 602, the branch X last instruction 603 and when branch Y has reached the EXIT_REGION instruction 604 as mentioned above.

As can be seen from the thread set memory 205 and the schematic hierarchical node representation of the content of the thread set memory 205, the thread sets identified by entries 0 and 2 cannot be scheduled for processing and are blocked. The thread sets of entries 1, 3 and 5 have no other entries pointing to them since they are leaf nodes and so can be freely selected for scheduling by the scheduling logic 204.

Accordingly, at step S10, the scheduling logic 204 schedules each thread set separately for concurrent execution within different pipeline stages of the execution unit 205. At step S20, each scheduled thread set is executed.

Branch x-1 Reconvergence

At step S30, it is identified that the thread (sub)set identified by entry 3 reaches the EXIT_REGION instruction 604.

The control flow unit 202 determines from the thread set memory 205 that the depth counter value for the corresponding entry (entry 3) is set at 0. Accordingly, at step S100, entry 3 is deleted from the thread set memory 201 and the threads identified by the thread set value are set in the parent entry. In this example, the thread set value in entry 2 is set to 0110 to indicate that the thread being executed by lane L1 has reached a reconvergence point.

At step S105 the content of the parent entry is considered (in this example, entry 2). At step S110 it is determined that there are still thread sets pointing to the parent entry (entry 2) and so the parent entry still has child nodes and so it is still not possible for the scheduling logic 204 to schedule that thread set (entry 2) for execution. This can be done by either checking the parent pointer value in every entry within the thread set memory to see if they refer to entry 2, by storing a mask which indicates the thread set value for this entry prior to any further divergence occurring (in this case 0111) or by comparing the number of threads that have reached a reconvergence point (i.e. threads 0110 indicated by the thread set value=2 threads) with the child node counter of the parent entry (which is set at 3).

Accordingly, the thread sets identified by entries 0 and 2 cannot be scheduled for processing and are blocked. The thread sets of entries 1 and 5 have no other entries pointing to them since they are leaf nodes and so can be freely selected for scheduling by the scheduling logic 204.

Branch X Reconvergence

At step S30, it is identified that the thread (sub)set identified by entry 5 reaches the EXIT_REGION instruction 604.

The control flow unit 202 determines from the thread set memory 205 that the depth counter value for the corresponding entry (entry 5) is set at 0. Accordingly, at step S100, entry 5 is deleted from the thread set memory 201 and the threads identified by the thread set value are set in the parent entry. In this example, the thread set value in entry 2 is set to 0111 to indicate that the thread being executed by lane L3 has reached a reconvergence point.

At step S105 the content of the parent entry is considered (in this example, entry 2). At step S110 it is determined that there are no thread sets pointing to the parent entry (entry 2) and so the parent entry has no child nodes. This can be done by either checking the parent pointer value in every entry within the thread set memory to see if they refer to entry 2, by storing a mask which indicates the thread set value for this entry prior to any further divergence occurring (again in this case 0111) or by comparing the number of threads that have reached a reconvergence point (i.e. threads 0111 indicated by the thread set value=3 threads) with the child node counter of the parent entry (which is set at 3).

Accordingly, at step S120 the instruction pointer value of the parent entry (entry 2) is updated to indicate the instruction following the instruction pointer value which was stored by entry 5 (155) and the annotation is removed and processing proceeds to step S90.

At step S90, the control flow unit 202 identifies that the depth counter value of the parent entry (entry 2) is set to 2 and so decreases the depth counter value to 1 at step S130.

Accordingly, the control flow unit 202 is now free to schedule the thread sets identified by either or both entries 1 and 2.

Potential Reconvergence

During the execution of the thread set identified by entry 2, a further EXIT_REGION instruction 605a is identified at step S30.

At step S90, the control flow unit 202 identifies that the depth counter value is set to 1 and so decreases the depth counter value for entry 2 to 0 at step S130. The presence of the depth counter value merely indicated that a potential divergence was identified previously by the ENTER_REGION instruction 505a but that no actual divergence occurred. Accordingly, the presence of the EXIT_REGION instruction 605a cannot be considered to indicate a reconvergence until the counter has been restored to its initial value of 0.

The control flow unit 202 is still free to schedule the thread sets identified by either or both entries 1 and 2.

Branch 2 Reconvergence

The control flow unit 202 continues to schedule the thread set identified by entry 2 until the EXIT_REGION instruction 608 is encountered. At this stage, the control flow unit 202 identifies that the depth counter for the thread set associated with entry 2 has a value of 0. Accordingly, the entry is deleted and any bits in the thread set value which are set at 1 are also set to 1 in the entry identified by the parent pointer (in this case entry 0). Accordingly, entry 0 now has a thread set value of 0111.

At step S105 the content of the parent entry is considered (in this example, entry 0). At step S110 it is determined that there are still thread sets pointing to the parent entry (entry 0) and so the parent entry still has child nodes and so it is still not possible for the scheduling logic 204 to schedule that thread set (entry 0) for execution. This can be done by either checking the parent pointer value in every entry within the thread set memory to see if they refer to entry 0, by storing a mask which indicates the thread set value for this entry prior to any further divergence occurring (in this case 1111) or by comparing the number of threads that have reached a reconvergence point (i.e. threads 0111 indicated by the thread set value=3 threads) with the child node counter of the parent entry (which is set at 4).

Branch 1 Reconvergence—Root Thread Set Reformation

Accordingly, the schedule logic 204 can only continue to schedule the thread set associated with entry 1 until the EXIT_REGION instruction 608 is encountered. At this point, the control flow unit 202 identifies at step S90 that the depth counter value for entry 1 is 0 and so sets any bits of the thread set value for entry 1 which are set to 1 to also be 1 in the thread set value of entry 0. Accordingly, the thread set value for entry 0 is now 1111 and entry 1 is deleted.

At step S105 the content of the parent entry is considered (in this example, entry 0).

The control flow unit 202 determines that no other entries within the thread set memory 201 point to entry 0 either by checking the parent pointer value of every entry to see if they refer to entry 0, by comparing the thread set value for entry 0 with a thread set mask value indicating the value of the thread set when the entry was first made (in this case also having the value 1111) or by comparing the number of threads that have reached a reconvergence point (i.e. threads 1111 indicated by the thread set value=4 threads) with the child node counter of the parent entry (which is set at 4). The control flow unit 202 updates the instruction pointer value for entry 0 to be the instruction after that which was held by entry 1 (in this case the value 191) and removes the annotation that the instructions associated with entry 0 cannot be scheduled for processing.

At step S90 it is determined that the depth counter for entry 0 is set at 1 and so it is decreased to 0 at step S130.

Accordingly, it can be seen that the root thread set has been reconverged and that the scheduler is now able to schedule this thread set when desired. Also, it can be seen that through this approach it is possible to schedule any thread set which is not pointed to by any other thread set for execution simultaneously within the pipeline stages along with any other such thread set. This allows for the simultaneous execution of such leaf node thread sets, which increases the performance of the processor significantly.

Unstructured Code Operation

Figure 4:
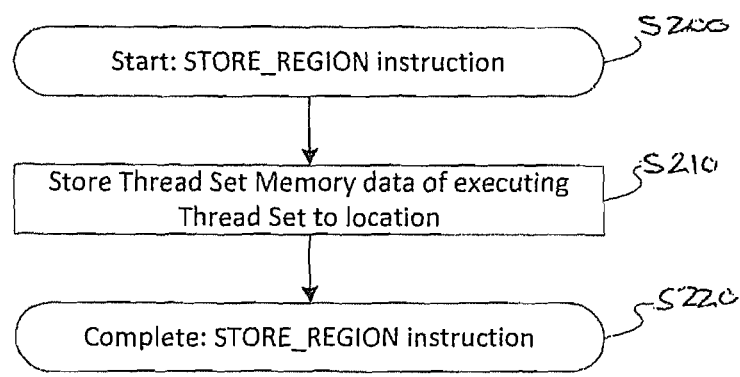
FIG. 4 illustrates the operation of the flow control unit when a STORE_REGION instruction is encountered.

When processing potentially unstructured code, STORE_REGION and RESTORE_REGION instructions will have been inserted into the instruction set, as mentioned above. FIG. 4 illustrates the operation of the flow control unit 202 when a STORE_REGION instruction is encountered.

At step S200, the execution of a STORE_REGION instruction is identified.

At step S210, the content of the entry for the thread set currently being executed which encounters the STORE_REGION instruction is stored in another location. For example, the content of the entry can be stored in another part of the thread set memory 205 or stored in another memory.

At step S220 processing of the STORE_REGION instruction is complete. Accordingly, it can be seen that the state of the entry for the thread set is stored in memory for later use.

Figure 5:
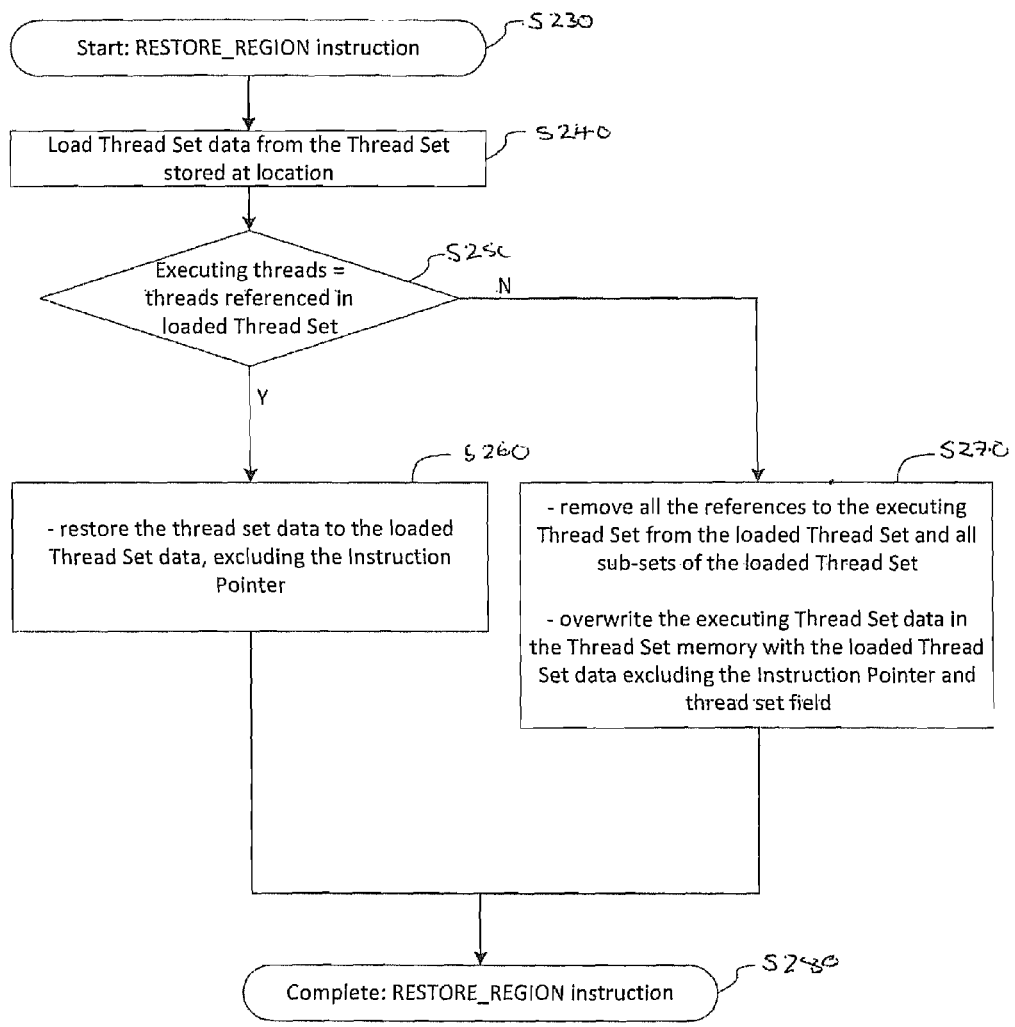
FIG. 5 illustrates the operation of the control flow unit on the occurrence of a RESTORE_REGION instruction being executed.

FIG. 5 illustrates the operation of the control flow unit 202 on the occurrence of a RESTORE_REGION instruction being executed.

At step S230, the RESTORE_REGION instruction is reported.

At step S240, the content of the entry for the thread set being executed which encountered the RESTORE_REGION instruction is loaded from the location it was stored at as a result of the corresponding STORE_REGION instruction.

At step S250, it is determined whether the threads in the thread set currently being executed which encountered the RESTORE_REGION instruction match the threads in the thread set that is being loaded from the location mentioned above. For example, if the thread set field 260 of the entry loaded from the location had the value 0111, then the control flow unit 202 will determine whether the value of the thread set field 260 for the thread set which encountered the RESTORE_REGION instruction also has the value of 0111. If the two thread set fields 260 match, then processing proceed to step S260 where the current entry in the thread set memory 205 is overwritten with all the content of the entry retrieved from the location mentioned above, but the instruction pointer value remains unchanged. Hence, this restores the table entry back to the state it was when the STORE_REGION instruction was encountered, but retains the current position in the instruction stream.

If it is determined at step S250 that not all of the threads of thread set that is being loaded from the location mentioned above are being executed, then processing proceeds to step S270. For example, this would happen if the thread set field 260 of the entry loaded from the location mentioned had the value 0111 but the thread set field 260 for the thread set which encountered the RESTORE_REGION instruction has the different value of 0001.

Accordingly, at step S270, the entry in the thread set memory 205 in which the thread set field 260 matches the thread set field 260 of the entry loaded from the location is identified. From this identified entry, the threads in the thread set field 260 of the executing thread set are removed. For example, in the above-mentioned case with the thread set field 260 loaded from the location having a value of 0111 and the thread set field 260 from the executing threads having a value of 0001, the entry is identified in the thread set memory having a thread set field 260 matching 0111. From this identified entry the reference to the executing thread set, represented by 0001, is removed from its thread set field 260. Accordingly, the thread set field 260 of the identified entry is changed from 0111 to 0110 in order to remove the reference to the executing thread set 0001.

The reference to the executing threads set (i.e. 0001) is also removed from all sub-sets of the identified thread set memory entry, excluding the thread set executing the RESTORE_REGION instruction.

The current entry in the thread set memory 205 of the thread set executing the RESTORE_REGION instruction is overwritten with all the content of the entry loaded from the aforementioned location, but the instruction pointer value and thread set entry 260 remain unchanged. This restores the table entry back to the state it was when the STORE_REGION instruction was encountered, but only for the threads executing RESTORE_REGION, and retains the current position in the instruction stream. This effectively decouples the threads executing RESTORE_REGION from other thread sets and thereby enables restoring the stored region state without interfering with the reconvergence of these other threads.

At step S280, processing of the RESTORE_REGION instruction completes.

Other Embodiments

In one embodiment, those threads with the highest depth counter are scheduled in preference to those with a lower depth counter. In those embodiments where the parent pointer is omitted then the depth counter may be inherited by a child node from the parents node and then incremented. Again, with this arrangement the threads with the higher depth counter are scheduled in preference to those with a lower depth counter.

In one embodiment, a parent-child relationship may be determined such that a child's parent is the thread set that originally contained all of the child's threads and the fewest additional threads. This requires each entry in the thread set memory 205 to store the thread set field 260 prior to further divergence occurring. This can be in the form of a mask which indicates the thread set value for this entry prior to any further divergence occurring, the pre-divergence mask. For example, when determining the parent for the executing thread set 0001 with three other entries in the thread set memory 205 with the pre-divergence masks of 1000, 0111 and 1111, the entry with pre-divergence mask 0111 is the parent as it contains the thread set 0001 and the fewest additional threads (i.e. 011<u>1</u> contains 000<u>1</u> and 0<u>111</u> contains two additional threads).

In one embodiment, at least some of the content of the thread set memory may be stored within the pipeline stages of the execution unit 203 itself.

In one embodiment, a region ID is stored on each divergence. With this approach, EXIT_REGION instructions where the executing thread set depth counter is set to 0 are only executed if the EXIT_REGION instruction has a matching ID.

In one embodiment, a block bit field is provided within the thread set memory to indicate that a thread set is not schedulable.

Although illustrative embodiments of the invention have been disclosed in detail herein, with reference to the accompanying drawings, it is understood that the invention is not limited to the precise embodiment and that various changes and modifications can be effected therein by one skilled in the art without departing from the scope of the invention as defined by the appended claims and their equivalents.

Aspects and embodiments of the invention are set out in the following numbered paragraphs. It is to be understood that the invention encompasses these aspects Paragraph 1. A data processing apparatus comprising:
a. a plurality of parallel lanes for parallel processing of sets of threads, each lane comprising a plurality of pipelined stages, said pipelined stages of each lane being operable to process instructions from said sets of threads; and
b. scheduling logic operable to schedule instructions for processing by said lanes, said scheduling logic being operable to identify that one of said sets of threads being processed is to be split into a plurality of sub-sets of threads and to schedule at least two of said plurality of sub-sets of threads for processing by different pipelined stages concurrently.

Paragraph 2. The data processing apparatus of paragraph 1, wherein each thread within said set of threads scheduled for processing shares a common instruction pointer value identifying at least one common instruction for parallel processing by said lanes.

Paragraph 3. The data processing apparatus of paragraph 1 or 2, wherein said scheduling logic comprises storage operable to store an indication of said set of threads and each of said sub-sets of threads.

Paragraph 4. The data processing apparatus of paragraph 3, wherein said indication of said set of threads and each of said sub-sets of threads comprises an instruction pointer value associated with each thread.

Paragraph 5. The data processing apparatus of any preceding paragraph, wherein said scheduling logic is operable to identify that said set of threads is to be split into said plurality of sub-sets of threads when different instructions are identified for parallel processing by the same stage within said lanes.

Paragraph 6. The data processing apparatus of any preceding paragraph, wherein said scheduling logic is operable to identify that said set of threads is to be split into said plurality of sub-sets of threads when a divergence in instruction pointer value occurs for at least one thread of said set of threads.

Paragraph 7. The data processing apparatus of any preceding paragraph, wherein said scheduling logic is operable to include, in each sub-set of threads, those threads sharing a common instruction pointer value identifying at least one common instruction for parallel processing by said lanes.

Paragraph 8. The data processing apparatus of any preceding paragraph, wherein said scheduling logic is operable to identify that a possible divergence in instruction pointer value may occur which is identified by a divergence indicator within a thread.

Paragraph 9. The data processing apparatus of paragraph 8, wherein said scheduling logic is operable to perform an adjustment of a reconvergence counter for said set of threads from an initial value on an occurrence of said divergence indicator.

Paragraph 10. The data processing apparatus of any preceding paragraph, wherein said scheduling logic is operable to identify recursively that one of said sub-sets of threads being processed is to be split into a further plurality of sub-sets of threads and to schedule at least two sub-sets of threads for processing by different pipelined stages concurrently.

Paragraph 11. The data processing apparatus of any preceding paragraph, wherein said scheduling logic is operable to schedule any at least two sub-sets of threads which have not themselves been split recursively into further sub-sets for processing by different pipelined stages concurrently.

Paragraph 12. The data processing apparatus of any preceding paragraph, wherein said scheduling logic is operable to prevent said set of threads from being scheduled for processing until said plurality of sub-sets of threads have reconverged again to share a common instruction pointer value.

Paragraph 13. The data processing apparatus of any one of paragraphs 10 to 12, wherein said scheduling logic is operable to reform a sub-set of threads when every further sub-set split from that sub-set of threads has reconverged again to share a common instruction pointer value.

Paragraph 14. The data processing apparatus of any one of paragraphs 9 to 13, wherein said scheduling logic is operable to reverse said adjustment of said reconvergence counter for said sub-set of threads when a possible reconvergence identified by a reconvergence indicator occurs within that sub-set of threads.

Paragraph 15. The data processing apparatus of any one of paragraphs 9 to 14, wherein said scheduling logic is operable to determine that a sub-set of threads has reached a possible reconvergence when said reconvergence counter returns to said initial value.

Paragraph 16. The data processing apparatus of any one of paragraphs 8 to 15, comprising logic operable to annotate an instruction stream comprising said instructions to provide said divergence and reconvergence indicators.

Paragraph 17. The data processing apparatus of any one of paragraphs 8 to 16, wherein said divergence and reconvergence indicators identify at least one of a single-entry single-exit region and a region of unstructured code.

Paragraph 18. The data processing apparatus of any one of paragraphs 8 to 17, wherein said scheduling logic is operable, on occurrence of a store indicator within a set of threads, to store in alternative storage contents of storage associated with said set of threads.

Paragraph 19. The data processing apparatus of any one of paragraphs 8 to 18, wherein said scheduling logic is operable, on occurrence of a restore indicator, to determine whether said set of threads within which said restore indicator occurred matches said set of threads whose contents are stored in said alternative storage and, if so, to overwrite contents in said storage associated with said set of threads with said contents from said alternative storage except for said instruction pointer value.

Paragraph 20. The data processing apparatus of any one of paragraphs 8 to 19, wherein said scheduling logic is operable, on occurrence of a restore indicator, to determine whether said set of threads within which said restore indicator occurred matches said set of threads whose contents are stored in said alternative storage and, if not, to remove an indication of said set of threads within which said restore indicator occurred from said contents and from contents associated with sub-sets of threads of said set of threads within which said reconvergence restore indicator occurred prior to overwriting contents in said storage associated with said set of threads with said contents from said alternative storage except for said instruction pointer value and said indication of said set of threads.

Paragraph 21. A data processing method of scheduling instructions for processing by a data processing apparatus comprising a plurality of parallel lanes for parallel processing of sets of threads, each lane comprising a plurality of pipelined stages, said pipelined stages of each lane being operable to process instructions from said sets of threads, said method comprising:
  c. identifying that one of said sets of threads being processed is to be split into a plurality of sub-sets of threads; and
  d. scheduling at least two of said plurality of sub-sets of threads for processing by different pipelined stages concurrently.

Paragraph 22. A computer program product operable, when executed on a computer, to perform the method steps of paragraph 21.

The invention claimed is:

1. A data processing apparatus comprising:
  a plurality of parallel lanes for parallel processing of sets of threads, each lane comprising a plurality of pipelined stages, said pipelined stages of each lane being operable to process instructions from said sets of threads; and
  scheduling logic operable to schedule instructions for processing by said lanes, said scheduling logic being operable to identify that one of said sets of threads being processed is to be split into a plurality of sub-sets of threads and to schedule at least two of said plurality of sub-sets of threads for processing by different pipelined stages concurrently, wherein said scheduling logic is operable to identify that a possible divergence in an instruction pointer value may occur which is identified by a divergence indicator within a thread included within said identified set of threads and to perform an adjustment of a reconvergence counter for said set of threads from an initial value on an occurrence of said divergence indicator.

2. The data processing apparatus of claim 1, wherein each thread within said set of threads scheduled for processing shares a common instruction pointer value identifying at least one common instruction for parallel processing by said lanes.

3. The data processing apparatus of claim 1, wherein said scheduling logic comprises storage operable to store an indication of said set of threads and each of said sub-sets of threads.

4. The data processing apparatus of claim 3, wherein said indication of said set of threads and each of said sub-sets of threads comprises an instruction pointer value associated with each thread.

5. The data processing apparatus of claim 1, wherein said scheduling logic is operable to identify that said set of threads is to be split into said plurality of sub-sets of threads when different instructions are identified for parallel processing by the same stage within said lanes.

6. The data processing apparatus of claim 1, wherein said scheduling logic is operable to identify that said set of threads is to be split into said plurality of sub-sets of threads when a divergence in instruction pointer value occurs for at least one thread of said set of threads.

7. The data processing apparatus of claim 1, wherein said scheduling logic is operable to include, in each sub-set of threads, those threads sharing a common instruction pointer value identifying at least one common instruction for parallel processing by said lanes.

8. The data processing apparatus of claim 1, wherein said scheduling logic is operable to identify recursively that one of said sub-sets of threads being processed is to be split into a further plurality of sub-sets of threads and to schedule at least two sub-sets of threads for processing by different pipelined stages concurrently.

9. The data processing apparatus of claim 1, wherein said scheduling logic is operable to schedule any at least two sub-sets of threads which have not themselves been split recursively into further sub-sets for processing by different pipelined stages concurrently.

10. The data processing apparatus of claim 1, wherein said scheduling logic is operable to prevent said set of threads from being scheduled for processing until said plurality of sub-sets of threads have reconverged again to share a common instruction pointer value.

11. The data processing apparatus of claim 8, wherein said scheduling logic is operable to reform a sub-set of threads when every further sub-set split from that sub-set of threads has reconverged again to share a common instruction pointer value.

12. The data processing apparatus of claim 1, wherein said scheduling logic is operable to reverse said adjustment of said reconvergence counter for said sub-set of threads when a possible reconvergence identified by a reconvergence indicator occurs within that sub-set of threads.

13. The data processing apparatus of claim 1, wherein said scheduling logic is operable to determine that a sub-set of threads has reached a possible reconvergence when said reconvergence counter returns to said initial value.

14. The data processing apparatus of claim 1, comprising logic operable to annotate an instruction stream comprising said instructions to provide said divergence and reconvergence indicators.

15. The data processing apparatus of claim 1, wherein said divergence and reconvergence indicators identify at least one of a single-entry single-exit region and a region of unstructured code.

16. The data processing apparatus of claim 1, wherein said scheduling logic is operable, on occurrence of a store indicator within a set of threads, to store in alternative storage contents of storage associated with said set of threads.

17. The data processing apparatus of claim 1, wherein said scheduling logic is operable, on occurrence of a restore indicator, to determine whether said set of threads within which said restore indicator occurred matches said set of threads whose contents are stored in said alternative storage and, if so, to overwrite contents in said storage associated with said set of threads with said contents from said alternative storage except for said instruction pointer value.

18. The data processing apparatus of claim 1, wherein said scheduling logic is operable, on occurrence of a restore indicator, to determine whether said set of threads within which said restore indicator occurred matches said set of threads whose contents are stored in said alternative storage and, if not, to remove an indication of said set of threads within which said restore indicator occurred from said contents and from contents associated with sub-sets of threads of said set of threads within which said restore indicator occurred prior to overwriting contents in said storage associated with said set of threads with said contents from said alternative storage except for said instruction pointer value and said indication of said set of threads.

19. A data processing method of scheduling instructions for processing by a data processing apparatus comprising a plurality of parallel lanes for parallel processing of sets of threads, each lane comprising a plurality of pipelined stages, said pipelined stages of each lane being operable to process instructions from said sets of threads, said method comprising:
    identifying that one of said sets of threads being processed is to be split into a plurality of sub-sets of threads;
    scheduling at least two of said plurality of sub-sets of threads for processing by different pipelined stages concurrently;
    identifying that a possible divergence in an instruction pointer value may occur which is identified by a divergence indicator within said identified one of said sets of threads; and,
    performing an adjustment of a reconvergence counter for said set of threads from an initial value on an occurrence of the divergence indicator.

20. A computer program product operable, when executed on a computer, to perform the method steps of claim 19.

* * * * *